United States Patent
Drive et al.

(10) Patent No.: US 8,049,748 B2
(45) Date of Patent: Nov. 1, 2011

(54) SYSTEM AND METHOD FOR DIGITAL VIDEO SCAN USING 3-D GEOMETRY

(75) Inventors: Marine Drive, Bangalore (IN);
Deepakumar Subbian, Bangalore (IN);
Mayur Salgar, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 669 days.

(21) Appl. No.: 11/761,571

(22) Filed: Jun. 12, 2007

(65) Prior Publication Data

US 2008/0309672 A1    Dec. 18, 2008

(51) Int. Cl.
*G06T 15/00* (2006.01)
*G06F 3/048* (2006.01)

(52) U.S. Cl. ........................................ 345/419; 715/782

(58) Field of Classification Search .................. None
See application file for complete search history.

(56) References Cited

U.S. PATENT DOCUMENTS

| | | | |
|---|---|---|---|
| 5,963,215 A | 10/1999 | Rosenzweig | |
| 6,452,611 B1 * | 9/2002 | Gerba et al. | 715/721 |
| 6,636,246 B1 * | 10/2003 | Gallo et al. | 715/805 |
| 6,661,426 B1 * | 12/2003 | Jetha et al. | 345/629 |
| 7,006,151 B2 | 2/2006 | Dieterich | |
| 7,007,295 B1 | 2/2006 | Rose et al. | |
| 7,016,116 B2 | 3/2006 | Dolgoff | |
| 7,216,305 B1 | 5/2007 | Jaeger | |
| 7,475,112 B2 * | 1/2009 | Sinclair et al. | 709/204 |

(Continued)

FOREIGN PATENT DOCUMENTS

EP    1 081 644 A3    3/2001

OTHER PUBLICATIONS

Girgensohn, A., Shipman, F., Dunnigan, A., Turner, T., and Wilcox, L. 2006. Support for effective use of multiple video streams in security. In Proceedings of the 4th ACM international Workshop on Video Surveillance and Sensor Networks (Santa Barbara, California, USA, Oct. 27-27, 2006). VSSN '06. ACM, New York, NY, 19-26.*

(Continued)

*Primary Examiner* — Daniel Hajnik
(74) *Attorney, Agent, or Firm* — Husch Blackwell (57) ABSTRACT

A system and method for providing digital video scan using 3-D geometry. The digital video scan system includes a 3-D scan scene maker for generating a plurality of video display units for displaying digital video data; a plurality of video producing devices producing a plurality of video feeds; a video scan sequencer receiving and organizing the plurality of video feeds into a predetermined order; a video rendering device rendering the digital video data from the plurality of video feeds for display within a separate one of the video display units; and video display apparatus displaying the digital video data from each video feed in the video display units. The plurality of video display units are positioned in a 3-D scene so that a plurality of video display units are at least partially viewable at the same time. Moreover, at intervals, the digital video data is incremented from one video display unit to another thus allowing an observer to view each digital video data in a foreground position. Furthermore, the observer is provided with a video data selector allowing the operator to select digital video data in one video display unit and move the selected digital video data to another video display unit.

16 Claims, 5 Drawing Sheets

U.S. PATENT DOCUMENTS

| | | | |
|---|---|---|---|
| 7,511,710 B2 * | 3/2009 | Barrett | 345/419 |
| 7,606,425 B2 * | 10/2009 | Bazakos et al. | 382/224 |
| 7,735,018 B2 * | 6/2010 | Bakhash | 715/782 |
| 7,865,834 B1 * | 1/2011 | van Os et al. | 715/756 |
| 2002/0093564 A1 * | 7/2002 | Israel | 348/145 |
| 2004/0150657 A1 * | 8/2004 | Wittenburg et al. | 345/619 |
| 2005/0030309 A1 * | 2/2005 | Gettman et al. | 345/419 |
| 2006/0174211 A1 * | 8/2006 | Hoellerer et al. | 715/782 |
| 2006/0279630 A1 * | 12/2006 | Aggarwal et al. | 348/143 |
| 2007/0052807 A1 | 3/2007 | Zhou et al. | |
| 2007/0220546 A1 * | 9/2007 | Shanks et al. | 725/38 |

OTHER PUBLICATIONS http://www.13praetorian.com/videoflashlight/index.htm Web page retrieved on Sep. 26, 2008, contains description of 3D surveillance interface wherein multiple video feeds are presented simultaneously on a single screen interface in 3D format. Further information at http://www.13praetorian.com/videoflashlight/VideoFlashlight_jan08_v4.pdf.

* cited by examiner

SYSTEM AND METHOD FOR DIGITAL VIDEO SCAN USING 3-D GEOMETRY

I. FIELD OF THE INVENTION

The present invention relates generally to video display. More specifically, the present invention relates to a system and method for displaying multiple video streams in a 3 dimensional geometry.

II. BACKGROUND OF THE INVENTION

Surveillance and security monitoring systems often employ multiple video cameras disposed at different locations to monitor activity in those locations. Conventionally, the video feeds from these cameras are fed to a central monitoring station and displayed on one or more display screens. The multiple display screens allow the central monitoring station personnel to view multiple cameras at the same time, and ideally the number of display screens would equal the number of video feeds so that all the cameras can be viewed simultaneously. However, such a large number of display screens can be prohibitively expensive, both in cost and required space.

Alternatively, the multiple video feeds can be displayed on a single display screen, thus reducing cost. In such a single display screen configuration, the video feeds may be displayed sequentially, one after the other according to the particular scan sequence. Alternatively, multiple video feeds may be displayed simultaneously on the one display screen, in sub-divisions of the screen, as shown in FIG. 1

Figure 1:
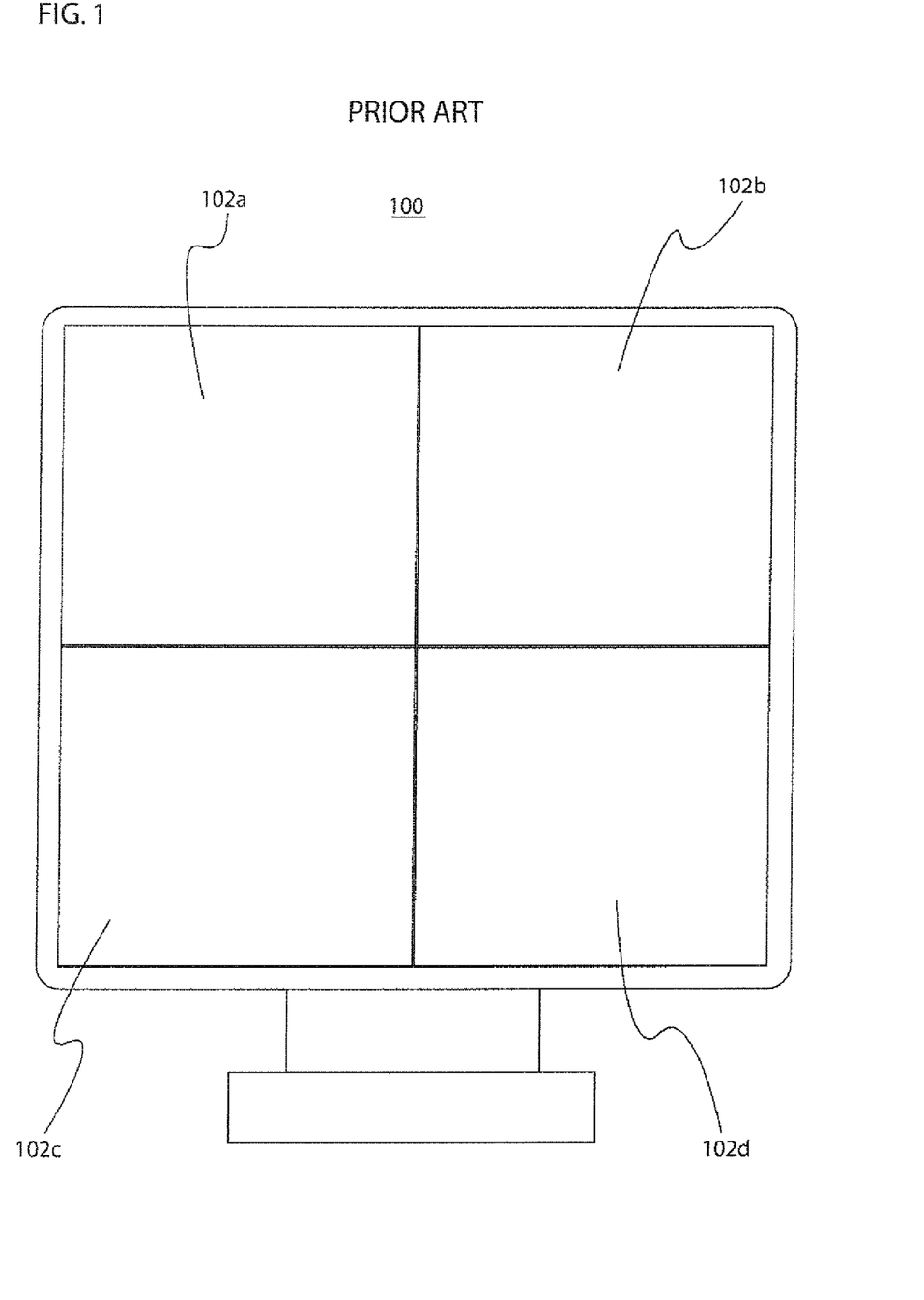
FIG. 1 illustrates a display screen displaying multiple video streams in a conventional manner.

Referring to FIG. 1, a display screen 100 is shown that is sub-divided into four quadrants 102a-d. Each quadrant of the four quadrants 102a-d displays a video feed originating from a separate camera. In this way, a security guard can monitor four video cameras simultaneously. While this method of displaying multiple video feeds works well for a small number of cameras, as the number of cameras increases, the viewing area of each displayed video feed decreases. Consequently, in situations where a large number of video feeds are displayed simultaneously, the details within each displayed video feed can be lost due to the reduced size. When in scan sequence operation, user can conventionally watch video feeds one by one only. While the user is watching one feed he is completely unaware of the next feed.

III. SUMMARY OF THE INVENTION

An object of the present invention is to increase the amount of information provided to the operator so that the operator has more situational awareness.

The present invention discloses a digital video scan system using 3-D geometry. The digital video scan system includes a 3-D scan scene maker for generating a plurality of video display units for displaying digital video data. The video display units are positioned to form a 3-D scene. A plurality of video producing devices produce a plurality of video feeds. A video scan sequencer receives and organizes the plurality of video feeds into a predetermined order. A video rendering device renders the digital video data from the plurality of video feeds for display within a separate one of the video display units. A video display apparatus displays the digital video data from each video feed in the video display units.

Additionally, the video rendering device includes a video data selector for selecting the digital video data displayed in a first video display unit of the video display units and moving the selected digital video data to a second video display unit.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF THE INVENTION

Figure 2:
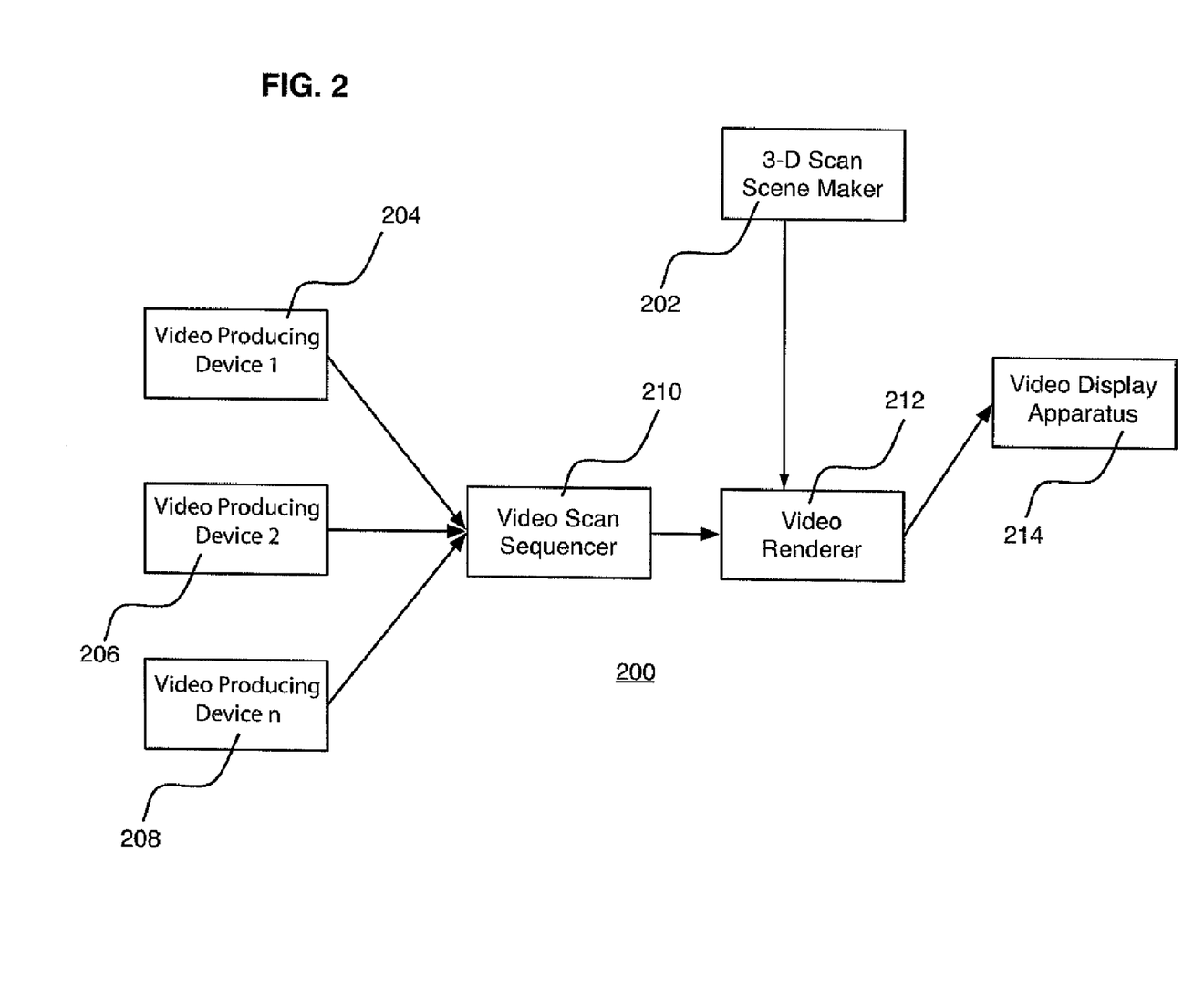
FIG. 2 illustrates a block representation of a digital video scan system using 3-D geometry in accordance with the present invention.

Referring to FIG. 2, a digital video scan system 200 of the present invention is configured with a 3-D scan scene maker 202 and a video scan sequencer 210. The 3-D scan scene maker 202 generates a 3-D scene, such as the scenes shown in FIG. 4 and FIG. 5. The generated 3-D scene contains a plurality of video display units 404 arranged in a predetermined pattern.

The video scan sequencer 210 receives video feeds from video producing device 1 204, video producing device 2 206 and video producing device n 208 as inputs, which are then placed in a predefined order. Such a predefined order may be based on position of cameras in relation to a particular location. For instance, the first video feed would be from a camera at an external entrance, the next being from a camera encountered in a hallway leading from the external entrance, and a third video feed being from a room or office off of the hallway. In this way security personnel would be able to follow the movements of an intruder or other persons of interest from the external entrance to a destination within the structure without too much effort.

Once the video scan sequencer 210 orders the video feeds, a video renderer 211 processes the ordered video feeds. The video renderer 212 prepares the video feeds for display within the 3-D scene generated by the 3-D scan scene maker 202 on a video display screen. The video feed processing performed by the video renderer may involve conversion of the video feeds into predefined video formats, such as RGB, YUY2, or any other video format that is adapted for display on the target video system. Any rendering technology, like Windows GDI/GDI+, DirectX, OpenGL for example, can be used to perform the rendering stage operation. The rendering stage composes the actual scene having the background image, video from the individual video feeds, and geometric position of the video display unit, placing each video within the 3D geometry.

The rendered video is then transmitted to a display screen by a video outputting device 214. The video outputting device 214 may be a S-Video output circuit with connector, a VGA output circuit with connector, a Composite Video output circuit with connector, or any other video output well known in the art.

Figure 3:
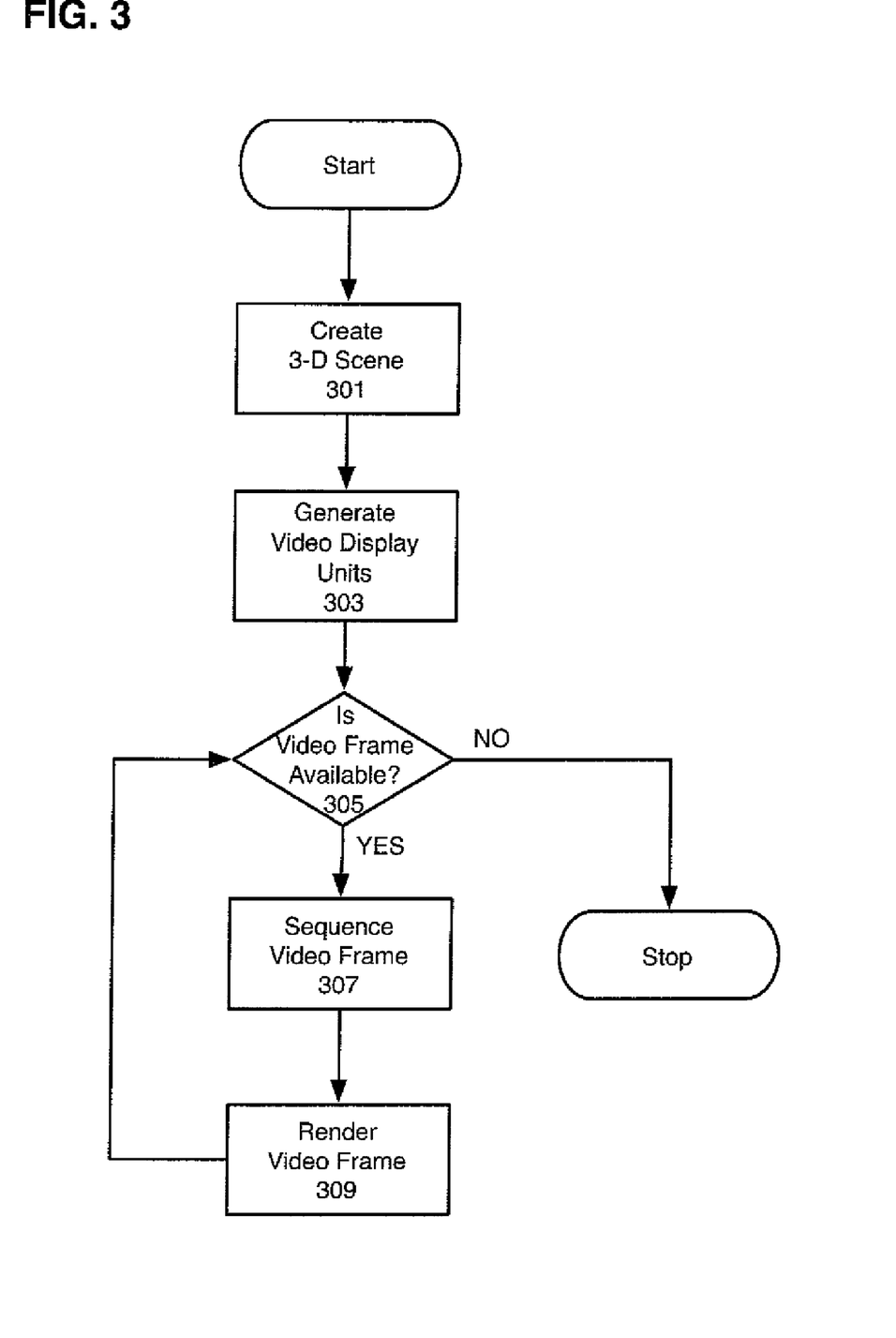
FIG. 3 illustrates a flow diagram of the process for performing an embodiment of the present invention.

Referring to FIG. 3, a method for performing a digital video scan with 3-D geometry, in accordance with the present invention, is shown. Beginning with step 301, the present embodiment creates a 3-D scene containing plurality of video display units generated in step 303. In step 305 the present embodiment checks for available video frames. If no video frames are available, the process ends. However, if video frames are available, the present embodiment proceeds to step 307. At step 307 each video frame is sequenced into an order determined by a predefined arrangement. Proceeding to step 309, the sequenced video frames are rendered for viewing in the generated 3-D scene.

Figure 4:
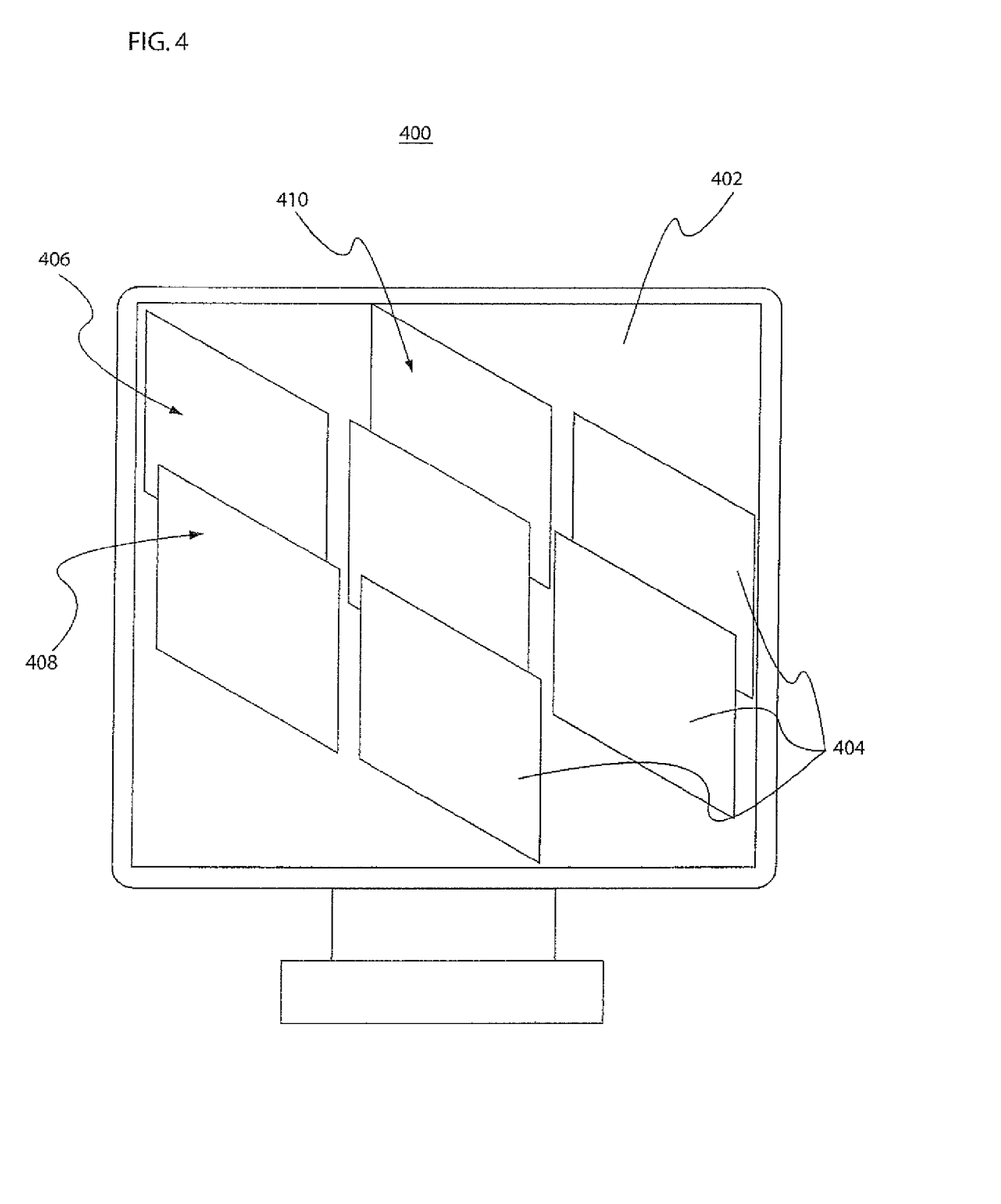
FIG. 4 illustrates an embodiment for a digital video scan system using 3-D geometry in accordance with the present invention.

FIG. 4 provides a representation of a display screen 400 implementing an embodiment of the present invention. The video display apparatus, or display screen, 400 has a display area 402 for displaying a 3-D scene containing a plurality of video display units 404. The embodiment shown in FIG. 4 contains 7 video display units arranged in three ranks, a first rank 406 of three video display units 404 positioned in the center of the 3-D scene, a second rank 408 of two video display units 404 positioned in the foreground of the 3-D scene, and a third rank 410 of two video display units 404 positioned in the background of the 3-D scene. All three ranks of video display units 404 are oriented to proceed at a diagonal from upper left corner to lower right corner of the display area.

Each video display unit 404 contains a video frame, or feed, from an individual camera. Thus in the embodiment shown in FIG. 4, 7 individual cameras can be viewed at one time. Additionally, after a predetermined length of time the video feeds proceed to the next video display unit 404. The predetermined length of time is tracked using a timing means.

For example, a video feed may be at the left-most video display unit 404 of the second rank 408 (i.e., the first video display unit). After a predetermined elapsed time, the video feed moves from the left-most to the right-most video display unit 404 in the second rank 408 (i.e., the second video display unit). After yet another predetermined elapsed time, the video feed proceeds to the right-most video display unit 404 of the first rank 406. The video feed continues to shuffle from one video display unit 404 to the next until the video feed arrives at the right-most video display unit 404 of the third rank 410 (i.e., the last video display unit). The video feed in the right-most video display unit 404 of the third rank 410 is moved off screen, i.e., the video feed is not viewable, or is returned to the first video display unit 404 depending on the total number of video feeds that are transmitted to the digital video scan system of the present invention.

In addition to, or as an alternative to, cycling through the supplied video feeds at predetermined time intervals, the video feeds can be advanced from one video display unit to another based on received security system events or alerts. For example, if the security system receives an intrusion alert from a sensor in a particular area, the video scan system 200 may respond by moving the video feed of that particular area, and possibly video feeds of immediately adjacent areas and/or other relevant security system related data, to the front most video display units. In this way, security personnel monitoring the video scan system 200 are made aware of a security system event or alert and are able to quickly confirm an intrusion.

Examples of some common security events and alerts contemplated in the present invention include video motion detection, video object tracking, people counting, left baggage detection, sub-system failure, events from virtual trip wire, server failures, smoke/fire/heat detection, as well as other events and alerts generated by security system sensors. Exemplar uses of various security events and alerts in combination with the present invention will be presently discussed.

In the case of a motion detection event, when motion is detected in an area, the related video feed may be added to the sequence of video feeds being displayed. Conversely, when no motion is detected for an extended period of time, the video feed from that area may be dropped from the sequence. Thus, only video streams having activity would be displayed to security personnel.

Another security event may be implemented by way of a people counting process. In this case, the number of people, i.e. size of a crowd, is determined and based on a predefined crowd size criteria, the video feed is brought into focus if the crowd exceeds the predetermined size. An increase in crowd size may indicate traffic flow problems, which may be caused by an incident in need of a security personnel's attention. The inverse may also be usefully applied, in that if an area that is normally quite crowded is suddenly significantly less crowded, such an occurrence may be indicative of a security problem in need of attention. Therefore, by using a people counting process to focus on video feeds exhibiting unexpected situations, personnel can be quickly alerted to security problems.

Further a left baggage detection process may be provided as well. Baggage left unattended in a particular area may indicate a possible bomb threat. Therefore the present invention ideally highlights video feeds showing possible unattended baggage. This can be accomplished by focusing on such a video feed, adding a video feed showing unattended baggage to sequence of unattended baggage video feeds, etc.

Furthermore, a virtual tripwire may be defined within a video feed. With a virtual tripwire, a line or perimeter is defined beyond which people are not permitted. Image processing software analyzes the video feeds set up in this manner, and if a person is detected on the forbidden side of the virtual tripwire, the video feed is brought into focus, added to the video sequence, or otherwise brought to the attention of the security personnel monitoring the video feeds.

Accordingly, the scan sequences displayed to security personnel can be constructed dynamically based on one or more security events and alerts.

Video object tracking may also be accomplished by way of the present invention. In this case, an object of interest, such as a person or vehicle, may be selected for tracking. The present invention identifies the direction of motion of the object of interest and based on the direction of the object, the present invention reorders the video streams so that the object of interest is followed from one area to the next. In this way, an intruder or suspicious object may be scrutinized and observed throughout the object's path of travel.

In the case where the number of video feeds is equal to seven or less video feeds, all the video feeds would be viewable at all times as they shuffle from one video display unit 404 to another. As the first video display unit is freed up by the shuffling of the video feeds, the video feed shuffled off screen from the last video display unit is displayed.

However, if more than seven video feeds are provided, only seven video feeds are displayed at any given time. As the first video display unit is freed up by the shuffling of the video feeds, a new video feed is displayed in the first video display unit. The video feed in the last video display unit is shuffled off screen and does not return to the first video display unit until the last of the available video feeds has moved to the second video display unit.

It should be realized that the present invention is not limited to seven video display units 404 nor is the present invention limited to the particular 3-D scene depicted in FIG. 4. Moreover, when the number of video feeds is equal to or less than the number of available video display units 404, the present invention does not require that the video feeds shuffle from one video display unit to another, as all of the video feeds are viewable without the need for the above-described shuffling.

Figure 5:
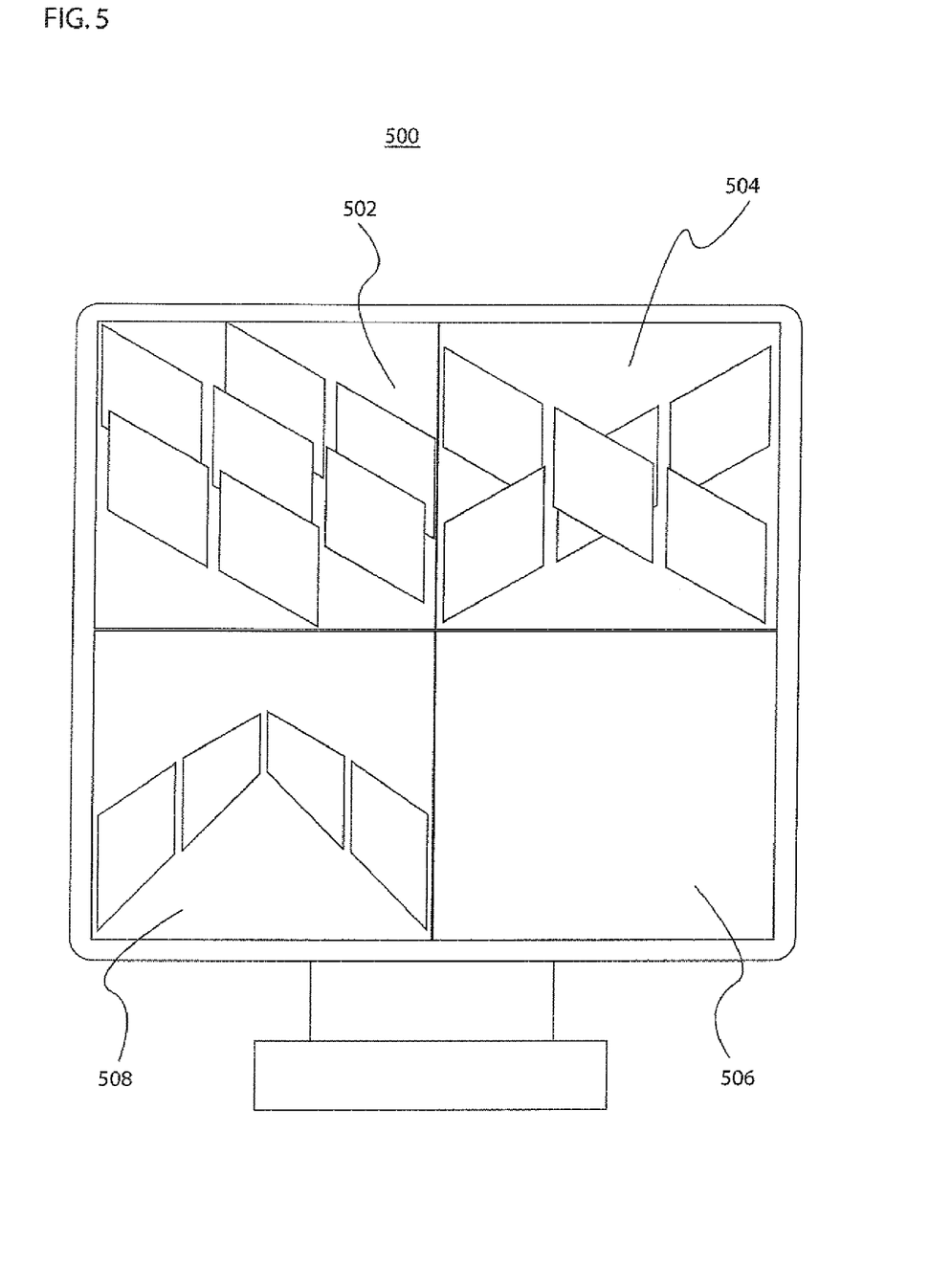
FIG. 5 illustrates another embodiment for a digital video scan system using 3-D geometry in accordance with the present invention.

FIG. 5 provides a display screen 500 having a alternate display configuration in accordance with the present invention. The display area of the display screen is segmented into 4 equally sized regions 502, 504, 506 and 508. Each region is configured to provide viewing of one or more video feeds. For example, region 502 may be configured to provide a 3-D scene as described above and shown in FIG. 4; region 504 may be configured into a 3-D scene in which the video display units are arranged in two intersecting ranks; region 508 may be configured into a 3-D scene in which the video display units are arranged into two ranks in 3-D perspective projection; and region 506 may be arrange to display a single video display unit sized to encompass the entire region 506.

A user of the present invention may be provided with the functionality of rearranging the video feeds from one video display unit to another, and from one region to another. The functionality is preferably implemented in a mode that allows rearranging and moving of video feeds with just a click and drag motion from the user. Moreover, the functionality is performable on the fly, such that as the video feeds are progressing from one video display unit to another (as described above with respect to FIG. 4) in regions 502, 504 and 508, a user may select one video feed—that perhaps shows a suspicious scene—and move the selected video feed to the larger video display unit in region 506. In this way the user can better examine the suspicious scene in order to determine whether an intrusion or other security issue has occurred that may require further action.

Additionally, the video display units do not only contain video feeds, but rather may contain any data, such as graphs, tables, etc. These non-video data are treated by the system in the same manner as the video feeds in that the non-video data scans across the 3-dimensional scene, moving from one video display unit to the next, as described above. Therefore, for the purposes of the present invention, the term video feed should be understood to encompass both real-time video originating from video cameras, as well as non real-time video data, such as text, graphs, still images, tables and other digital data.

The particular 3-D scene arrangements shown in FIG. 4 and in regions 502, 504 and 508 of the FIG. 5 are solely for illustrative purposes. The specific 3-D arrangement used in the present invention may be designed to best satisfy the needs of the particular application.

Further, functionality may be provided to allow a user to select a video feed, or even a non-video data, contained within a video display unit and maximize the video display unit to full screen. Thus allowing, a user to quickly examine a suspicious scene or analyze data more closely. Once the user completes the examination of the scene or data, the display can be reverted back to the 3D sequence mode. This option would allow the user to watch any one of the video display units more closely and then resume scanning.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A digital video scan system using 3-D geometry, said system comprising:
a 3-D scan scene maker for generating a plurality of video display units for displaying real-time digital video data, said video display units being positioned to form a 3-D scene, the video display units arranged into a plurality of ranks where each rank includes at least two, directly adjacent, video display units extending diagonally across the 3-D scene in a straight line with respective sides of the at least two video display units mutually parallel and with a relatively constant spacing between adjacent video display units extending diagonally across the 3-D scene and a relatively constant spacing between video display units of adjacent ranks of the plurality of ranks;
a plurality of video producing devices for producing a plurality of video feeds;
a video scan sequencer for receiving and organizing said plurality of video feeds into a predetermined order;
a video rendering device for rendering said digital video data from said plurality of video feeds, said digital video data from each video feed being rendered for display within a separate one of said video display units; and
a video display apparatus for automatically displaying said real time digital video data from each video feed in each of said video display units wherein said digital video data of each of the plurality of video feeds is sequentially displayed on each of the plurality of video display units in the predetermined order for a predetermined time period before cycling to a next of the plurality of video display units.

2. The digital video scan system as in claim 1, wherein said video rendering device further comprises a video data selector for selecting said digital video data displayed in a first video display unit of said video display units and moving said selected digital video data to a second video display unit.

3. The digital video scan system as in claim 2, wherein said video data selector is automatically controlled by said video rendering device.

4. The digital video scan system as in claim 3, wherein said video rendering device further comprises a timer for tracking an elapsed time, said video data selector selecting said digital video data and moving said selected digital video data at predefined intervals of said elapsed time.

5. The digital video scan system as in claim 3, wherein said video data selector selects said digital video data and moves said selected digital video data in response to any one of security system events and alerts.

6. The digital video scan system as in claim 2, wherein a user manually controls said video data selector.

7. The digital video scan system as in claim 6, further comprising: a user interface device for selecting said video data displayed in a first video display unit of said video display units; and moving said selected video data to a second video display unit.

8. The method as in claim 6, wherein said user interface device allows maximizing of said selected digital video data to encompass an entire viewable area of a display screen; and returning said maximized display back to said 3-D scene display.

9. A method for displaying a plurality of video feeds in a 3-D geometry, said method comprising:
generating a plurality of video display units for displaying real-time digital video data, said video display units being positioned to form a 3-D scene, the video display units arranged into a plurality of ranks where each rank includes at least two directly adjacent video display units extending diagonally across the 3-D scene in a straight line with respective sides of the at least two video display units mutually parallel and with a relatively constant spacing between adjacent video display units extending diagonally across the 3-D scene and a relatively constant spacing between video display units of adjacent ranks of the plurality of ranks;
producing a plurality of video feeds;
receiving said plurality of video feeds;
organizing said received plurality of video feeds into a predetermined order;

rendering said digital video data from said plurality of video feeds, said digital video data from each video feed being rendered for display within a separate one of said video display units; and automatically outputting said digital video data from each video feed in said video display units on a video display device wherein said real-time digital video data of each of the plurality of video feeds is sequentially displayed on each of the plurality of video display units in the predetermined order for a predetermined time period before cycling to a next of the plurality of video display units.

10. The method as in claim 9, further comprising: selecting said digital video data displayed in a first video display unit of said video display units; and moving said selected digital video data to a second video display unit.

11. The method as in claim 10, wherein said selecting and moving is automatically controlled.

12. The method as in claim 11, further comprises tracking an elapsed time, and performing said selecting and said moving steps at predefined intervals of said elapsed time.

13. The method as in claim 11, wherein said selecting and said moving steps are performed in response to any one of security system events and alerts.

14. The method as in claim 10, wherein a user manually controls said selecting and moving.

15. The method of claim 13, wherein said selecting and said moving is performed using a device selected from the group consisting of a mouse and a pointing device.

16. The method as in claim 9, further comprising: selecting said digital video data displayed in a first video display unit of said video display units; maximizing said selected digital video data to encompass an entire viewable area of a display screen; and returning said maximized display back to said 3-D scene display.

* * * * *